(12) United States Patent
Walls

(10) Patent No.: US 9,747,177 B2
(45) Date of Patent: Aug. 29, 2017

(54) DATA STORAGE SYSTEM EMPLOYING A HOT SPARE TO STORE AND SERVICE ACCESSES TO DATA HAVING LOWER ASSOCIATED WEAR

(71) Applicant: INTERNATIONAL BUSINESS MACHINES CORPORATION, Armonk, NY (US)

(72) Inventor: Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 131 days.

(21) Appl. No.: 14/585,886

(22) Filed: Dec. 30, 2014

(65) Prior Publication Data

US 2016/0188424 A1 Jun. 30, 2016

(51) Int. Cl.
*G06F 11/16* (2006.01)
*G06F 11/20* (2006.01)
(Continued)

(52) U.S. Cl.
CPC ...... *G06F 11/1662* (2013.01); *G06F 11/2056* (2013.01); *G06F 11/2064* (2013.01);
(Continued)

(58) Field of Classification Search
CPC ............. G06F 11/1662; G06F 11/2056; G06F 11/2064; G06F 11/2087; G06F 11/2094;
(Continued)

(56) References Cited

U.S. PATENT DOCUMENTS

| 5,418,925 A * | 5/1995 | DeMoss | G06F 11/1076 711/114 |
| 6,223,252 B1 | 4/2001 | Bandera et al. | |

(Continued)

FOREIGN PATENT DOCUMENTS

CN 103617006 5/2014

OTHER PUBLICATIONS

Anonymous, "A method to expand SSD cache using hot spare disks", IPCOM000233970D, Jan. 2014.
(Continued)

*Primary Examiner* — Matt Kim
*Assistant Examiner* — Paul Contino
(74) *Attorney, Agent, or Firm* — Brian F. Russell; Randall J. Bluestone

(57) ABSTRACT

A controller monitors access frequencies of address ranges mapped to a data storage array. Based on the monitoring, the controller identifies frequently accessed ones of the address ranges that have lower associated wear, for example, those that are read more often than written. In response to the identifying, the controller initiates copying of a dataset associated with the identified address ranges from the data storage array to a spare storage device while refraining from copying other data from the data storage array onto the spare storage device. The controller directs read input/output operations (IOPs) targeting the identified address ranges to be serviced by access to the spare storage device. In response to a failure of a failed storage device among the plurality of primary storage devices, the controller rebuilds contents of the failed storage device on the spare storage device in place of the dataset associated with the identified address ranges.

22 Claims, 12 Drawing Sheets

(51) Int. Cl.
*G06F 11/34* (2006.01)
*G06F 11/30* (2006.01)

(52) U.S. Cl.
CPC ...... *G06F 11/2087* (2013.01); *G06F 11/2094* (2013.01); *G06F 11/3034* (2013.01); *G06F 11/3485* (2013.01); *G06F 11/2017* (2013.01); *G06F 11/2089* (2013.01); *G06F 2201/88* (2013.01)

(58) Field of Classification Search
CPC ............ G06F 11/3485; G06F 11/3034; G06F 11/2017; G06F 11/2089
See application file for complete search history.

(56) References Cited

U.S. PATENT DOCUMENTS

| | | | |
|---|---|---|---|
| 6,598,174 B1* | 7/2003 | Parks ................... | G06F 11/008 711/162 |
| 7,139,931 B2* | 11/2006 | Horn ................... | G06F 11/1092 711/114 |
| 7,216,195 B1* | 5/2007 | Brown ................ | G06F 11/2094 326/125 |
| 7,698,592 B2 | 4/2010 | Cashman | |
| 7,827,351 B2 | 11/2010 | Suetsugu et al. | |
| 7,895,393 B2 | 2/2011 | Li | |
| 8,082,390 B1 | 12/2011 | Fan et al. | |
| 8,332,576 B2* | 12/2012 | Chu ................... | G06F 12/0246 711/103 |
| 8,386,837 B2 | 2/2013 | Ito et al. | |
| 8,495,295 B2* | 7/2013 | Kopylovitz ......... | G06F 11/1092 711/114 |
| 8,560,759 B1* | 10/2013 | Boyle ................. | G06F 12/0246 711/101 |
| 8,601,311 B2 | 12/2013 | Horn | |
| 8,762,772 B2 | 6/2014 | Yen et al. | |
| 8,775,735 B2 | 7/2014 | Chang et al. | |
| 8,812,901 B2 | 8/2014 | Sheffield, Jr. | |
| 8,812,902 B2 | 8/2014 | Deepak | |
| 9,104,321 B2* | 8/2015 | Cudak ................... | G06F 3/0619 |
| 9,104,604 B2 | 8/2015 | Cooper et al. | |
| 9,378,093 B2* | 6/2016 | Cooper ................ | G06F 11/108 |
| 9,405,676 B2* | 8/2016 | Jeddeloh ............. | G06F 12/0246 |
| 2002/0091965 A1* | 7/2002 | Moshayedi ........... | G06F 11/004 714/6.13 |
| 2004/0059869 A1* | 3/2004 | Orsley ................ | G06F 11/1076 711/114 |
| 2004/0059958 A1* | 3/2004 | Umberger ........... | G06F 11/1092 714/6.32 |
| 2006/0041793 A1 | 2/2006 | Cherian et al. | |
| 2007/0088990 A1* | 4/2007 | Schmitz ................. | G11B 20/20 714/700 |
| 2009/0077418 A1* | 3/2009 | Navarro .............. | G06F 11/1662 714/16 |
| 2009/0172254 A1* | 7/2009 | Chen ................... | G06F 12/0246 711/103 |
| 2009/0265503 A1* | 10/2009 | Hung .................. | G06F 12/0246 711/100 |
| 2009/0327603 A1 | 12/2009 | McKean et al. | |
| 2010/0079885 A1* | 4/2010 | McKean ............. | G06F 11/1662 360/15 |
| 2012/0054427 A1* | 3/2012 | Huang ...................... | G06F 3/06 711/108 |
| 2013/0061019 A1* | 3/2013 | Fitzpatrick .......... | G06F 11/3485 711/173 |
| 2013/0124798 A1 | 5/2013 | Aszmann et al. | |
| 2013/0138871 A1* | 5/2013 | Chiu ................... | G06F 12/0246 711/103 |
| 2013/0232292 A1* | 9/2013 | Bandic ..................... | G06F 3/061 711/103 |
| 2014/0025887 A1 | 1/2014 | Kim et al. | |
| 2014/0198629 A1 | 7/2014 | Takagi et al. | |
| 2014/0325262 A1 | 10/2014 | Cooper et al. | |
| 2015/0095572 A1* | 4/2015 | Koike ................... | G06F 3/0634 711/114 |
| 2015/0100822 A1 | 4/2015 | Ohno | |
| 2016/0162205 A1* | 6/2016 | Grimsrud .............. | G06F 3/0616 711/103 |
| 2016/0342476 A1* | 11/2016 | Nazari ..................... | G06F 3/06 |

OTHER PUBLICATIONS

Anonymous, "Using hot spare disk drives for performance enhancement in a RAID system", IPCOM000019208D, Sep. 2003.
Savage, Stefan, and John Wilkes, "Afraid—A Frequently Redundant Array of Independent Disks," originally published in the Proceedings of the USENIX 1996 Annual Technical Conference, Usenix.org., Jan. 1996.
Tian et al., "SPA: On-Line Availability Upgrades for Parity-Based RAIDs through Supplementary Parity Augmentations," CSE Technical Reports, TR-UNL-CSE-2009-0006, Department of Computer Science and Engineering, University of Nebraska—Lincoln, Feb. 20, 2009, 16 pages.
Nam et al., "Enhancing Write I/O Performance of Disk Array RM2 Tolerating Double Disk Failures," Proceedings of the International Conference on Parallel Processing (ICPP'02), IEEE Computer Society, 2002.
Anonymous, "Using hot spare disk drives for performance enhancement in a RAID system", Sep. 2003.
Anonymous, "A method to expand SSD cache using hot spare disks", Jan. 2014.
Wan et al. (2010). S2-RAID: A New Raid Architecture for Fast Data Recovery. IEEE 26th Symposium on Mass Storage Systems and Technologies (MSST).
Disclosed Anonymously (2014). Method and System for Reducing Read Overhead in a Redundant Array of Inexpensive Disks, 1-3.
Disclosed Anonymously (2013). Method and System for Augmenting RAID 5 protection with RAID 6 Protection, 1-4.

* cited by examiner

US 9,747,177 B2

DATA STORAGE SYSTEM EMPLOYING A HOT SPARE TO STORE AND SERVICE ACCESSES TO DATA HAVING LOWER ASSOCIATED WEAR

BACKGROUND OF THE INVENTION

This disclosure relates to data processing and storage, and more specifically, to a data storage system, such as a flash memory system, that employs a hot spare storage device to store, and to service accesses to, a dataset that has low associated wear, for example, a dataset that is more frequently read than written.

NAND flash memory is an electrically programmable and erasable non-volatile memory technology that stores one or more bits of data per memory cell as a charge on the floating gate of a transistor. In a typical implementation, a NAND flash memory array is organized in blocks (also referred to as "erase blocks") of physical memory, each of which includes multiple physical pages each in turn containing a multiplicity of memory cells. By virtue of the arrangement of the word and bit lines utilized to access memory cells, flash memory arrays can generally be programmed on a page basis, but are erased on a block basis.

In data storage systems employing NAND flash memory and/or other storage technologies such as magnetic hard disk drives (HDDs), the availability and/or performance of the data storage system is enhanced by employing some level of data redundancy. For example, data storage systems often employ one or more arrangements (often referred to as "levels") of redundant array of inexpensive (or independent) disks (RAID). Commonly employed RAID levels include RAID 0, which employs data striping across a set of RAID disks (RAID 0 in and of itself does not improve availability but can improve performance); RAID 1, which involves mirroring of RAID disks; RAID 4, which implements block-level striping across RAID disks and a dedicated parity drive; RAID 5, which implements block-level striping across RAID disks and distributed storage of parity information; and RAID 6, which implements block-level striping across RAID disks and distributed storage of two independent sets of parity information. Various RAID levels can also be used in combination to form hybrid RAID arrays; for example, RAID 10, which combines RAID 1 and RAID 0, implements a mirrored set of striped drives. The data redundancy provided by the various standard or hybrid RAID levels allow the data storage system to recover from various modes of failure, thus generally improving data availability and storage system reliability.

In addition to the data redundancy provided by the various levels of RAID, physical device redundancy can also be provided through the provision of one or more spare storage drives. In many cases, the spare storage drives can be so-called "hot" spare drives in that the storage drives are powered on, formatted (if applicable), and ready to be used to rebuild the data storage array in case of the failure of one or more of the storage drives comprising the data storage array. In many cases, hot spare drives do no useful work until a drive failure occurs. After the replacement of the defective drive, the hot spare drive will then usually be employed as the spare and again do no work until and unless another drive fails. Thus, depending on the failure domain(s) to which a hot spare drive is applied, the hot spare drive may never be used, or at most, may be actively used for only a few hours out of the entire life of the data storage array.

In some prior art literature, it has been proposed to make use of the storage capacity of hot spare drives. For example, the technical disclosure "A method to expand SSD cache using hot spare disks." IP.com No. 000233970 (Jan. 6, 2014) discloses:

So, use [of] the SSD hot spare disks to expand the SSD cache memory will enlarge the cache memory, thus improve the IO performance, and increase the resource utilization rate. After configuring the SSD hot spare disks as SSD cache memory, the cache memory will be composed by dedicated cache and dynamic cache, dedicated cache is serves [sic] as cache all the time, and dynamic cache is the SSD hot spare disk.

The technical disclosure "Using Hot Spare Disk Drives for Performance Enhancement in a RAID System." IP.com No. 000019208 (Sep. 4, 2003) further discloses the following regarding use of a hot spare HDD in an HDD RAID system:

As part of the RAID system parameter definitions, performance targets are defined for each volume in RAID 100. Some systems may have peak usage times for particular volumes at predictable times, or the system administrator may determine high usage volumes based on performance tracking. In either case, the solution is to treat hot spare 150 as an active spare. RAID controller writes a temporary duplicate of the frequently requested data on hot spare 150, represented in this figure by copied volume 180, an exact duplicate of volume 170. This duplication allows for a greater number of simultaneous data requests to be processed more efficiently by using per-command cost function calculations.

However, the present application recognizes that previously known uses of hot spare drives are limited in their ability to optimize performance of the data storage system.

BRIEF SUMMARY

In at least one embodiment, a data storage system includes a controller, a spare storage device, and a plurality of primary storage devices across which a data storage array is distributed. The controller monitors access frequencies of address ranges mapped to the data storage array. Based on the monitoring, the controller identifies address ranges having lower associated wear, for example, address ranges that are read more often than written. In response to the identifying, the controller initiates copying of a dataset associated with the identified address ranges from the data storage array onto the spare storage device while refraining from copying other data from the data storage array onto the spare storage device. The controller directs read input/output operations (IOPs) targeting the identified address ranges to be serviced by access to the spare storage device. In response to a failure of a failed storage device among the plurality of primary storage devices, the controller rebuilds contents of the failed storage device on the spare storage device in place of the dataset associated with the identified address ranges. By selectively utilizing the spare storage device to hold a dataset that is predominately read, utilization of the spare storage device is optimized.

In at least one embodiment, the controller will determine the maximum amount of data to store on the spare storage device based on monitoring performance of the data which is stored on the spare storage device. For example, in response to the performance parameter reaching a certain level or starting to decrease, the controller of the storage system will use the determined amount of data as the maximum amount of data that will be stored on the spare storage device. In various embodiments, this maximum amount of data can be static or can change dynamically as the workload shifts. In this manner, performance of the spare storage device is optimized.

In at least one embodiment, the performance parameter the controller uses to determine to the maximum amount of data to store on the spare storage device is based on at least one of a set including a number of pending IOPs and the average response time of IOPs serviced by accessing the spare storage device.

In at least one embodiment, the controller, based on the monitoring, repeatedly updates the identified address ranges and the dataset on the spare storage device. In this manner, the dataset is updated responsive to changes in the access pattern of the workload serviced by the data storage system.

In at least one embodiment, the controller resizes the dataset based on a performance parameter of the spare storage device, such that the performance of the spare storage device is optimized.

In at least one embodiment, the controller determines whether to service read IOPs requesting data within the dataset by reference to the spare storage device based on a read IOP policy. The controller will place data on the spare storage device that the read IOP policy indicates are to be serviced by reference to the spare storage device.

In at least one embodiment, in response to a read IOP targeting a particular data granule within the dataset, the controller initiates retrieval of the particular data granule from both the data storage array and the spare storage device and cancels retrieval of the particular data granule from one of the data storage array and the spare storage device based on the read IOP policy, such that access latency is reduced.

In at least one embodiment, rebuilding the data storage array includes initiating a trim or invalidate process to delete the dataset from the spare storage device. During the deletion, the controller directs that an IOP targeting data in the dataset is served by reference to the spare storage device, such that access latency is reduced. This trim process may comprise invalidating entries in a mapping table, or erasing data from the spare storage device, or both.

In at least one embodiment, it is acceptable for the spare storage device to store data to which some amount of writes are directed. The controller preferably monitors to ensure that the wear on the spare storage drive is not exceeding a previously determined wear threshold, as indicated, for example, by a bit error rate metric and/or a program/erase cycle count. If the wear threshold is exceeded, the controller can eliminate from the spare storage device selected address ranges that have excessive writes in to reduce the wear rate of the spare storage device. It is preferred if wear of the spare device wear is controlled such that the rate of wear (e.g., as indicated by a count of writes and/or a bit error rate metric and/or a program/erase cycle count) does not exceed that of the other storage devices.

In at least one embodiment, a write IOP targeting an address assigned to the spare storage device is serviced by writing the write data both to the RAID array (e.g., RAID 10, RAID 5, RAID 6, or any other standard or hybrid RAID level) and to the spare storage device.

In at least one embodiment, multiple spare storage devices can be implemented within a RAID array or set of RAID arrays by assigning each spare storage device a subset of the frequently read address ranges. In this case, if an array rebuild is required, only the subset of the frequently read address range(s) assigned to the spare storage device needed to rebuild the RAID array would no longer have the performance acceleration provided by the spare storage drive. In an alternative embodiment, data can also be striped across the multiple spare storage device, but in this embodiment, the performance acceleration supported by the spare storage devices would be unavailable across all of the frequently read address range(s) while the rebuild and repair operations are performed.

In at least one embodiment, if a storage device in the array fails, the controller can mark all the data on a spare storage drive as already rebuilt and then skip rebuilding the corresponding address range(s). In this event, the RAID array then functions as if no spare storage device were used to accelerate performance.

DETAILED DESCRIPTION

Figure 1A:
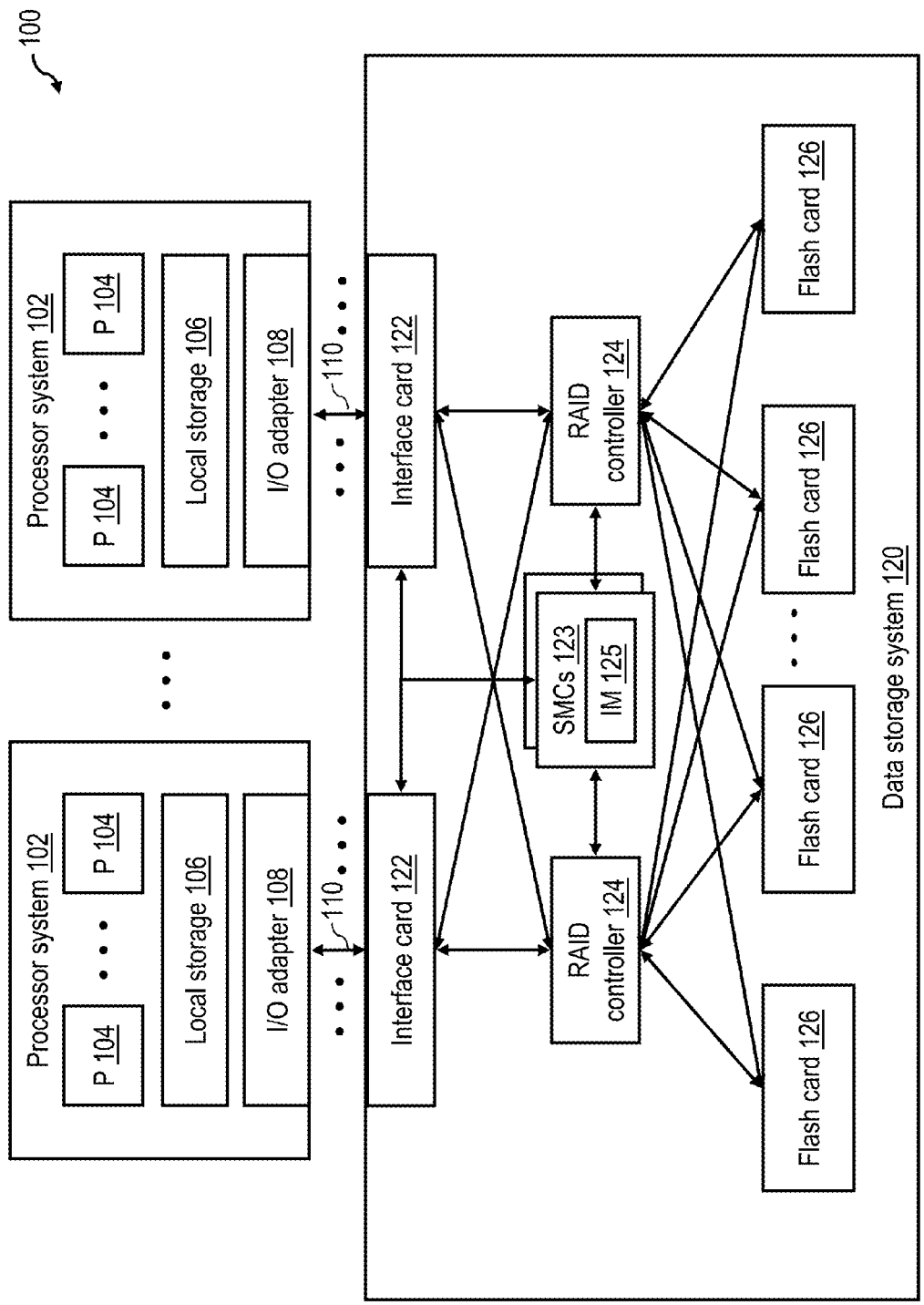
FIG. 1A is a high level block diagram of a data processing environment in accordance with one embodiment.

With reference to the figures and with particular reference to FIG. 1A, there is illustrated a high level block diagram of an exemplary data processing environment 100 including a data storage system 120 having a non-volatile memory array as described further herein. As shown, data processing environment 100 includes one or more hosts, such as a processor system 102 having one or more processors 104 that process instructions and data. Processor system 102 may additionally include local storage 106 (e.g., dynamic random access memory (DRAM) or disks) that may store program code, operands and/or execution results of the processing performed by processor(s) 104. In various embodiments, processor system 102 can be, for example, a mobile computing device (such as a smartphone or tablet), a laptop or desktop personal computer system, a server computer system (such as one of the POWER series of servers available from International Business Machines Corporation), or a mainframe computer system. Processor system 102 can also be an embedded processor system using various processors such as ARM, PowerPC, Intel X86, or any other processor combined with memory caches, memory controllers, local storage, I/O bus hubs, etc.

Each processor system 102 further includes an input/output (I/O) adapter 108 that is coupled directly (i.e., without any intervening device) or indirectly (i.e., through at least one intermediate device) to a data storage system 120 via an I/O channel 110. In various embodiments, I/O channel 110 may employ any one or a combination of known or future developed communication protocols, including, for example, Fibre Channel (FC), FC over Ethernet (FCoE), Internet Small Computer System Interface (iSCSI), InfiniBand, Transport Control Protocol/Internet Protocol (TCP/IP), Peripheral Component Interconnect Express (PCIe), etc. I/O operations (IOPs) communicated via I/O channel 110 include read IOPs by which a processor system 102 requests data from data storage system 120 and write IOPs by which a processor system 102 requests storage of data in data storage system 120.

Although not required, in the illustrated embodiment, data storage system 120 includes multiple interface cards 122 through which data storage system 120 receives and responds to input/output operations (IOP) 102 via I/O channels 110. Each interface card 122 is coupled to each of multiple Redundant Array of Inexpensive Disks (RAID) controllers 124 in order to facilitate fault tolerance and load balancing. Each of RAID controllers 124 is in turn coupled (e.g., by a PCIe bus) to each of multiple flash cards 126 including, in this example, NAND flash storage media. In other embodiments, alternative and/or additional non-volatile storage devices can be employed.

In the depicted embodiment, the operation of data storage system 120 is managed by redundant system management controllers (SMCs) 123, which are coupled to interface cards 122 and RAID controllers 124. In various embodiments, each system management controller 123 can be implemented utilizing hardware or hardware executing firmware and/or software. As described in greater detail below with reference to FIG. 4, each system management controller 123 includes an IOP monitor (IM) 125.

Figure 1B:
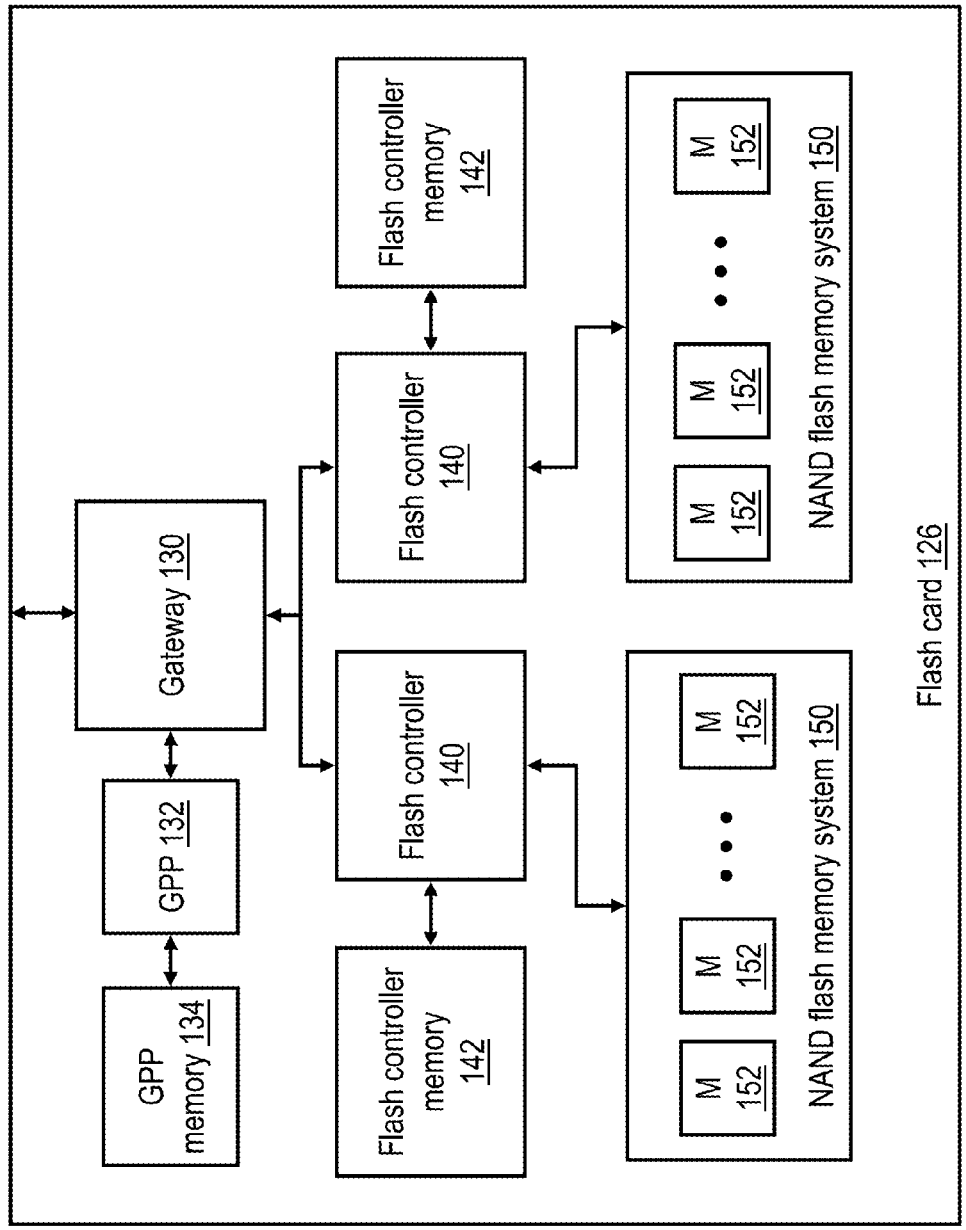
FIG. 1B is a more detailed block diagram of a flash card of the data storage system of FIG. 1A.

FIG. 1B depicts a more detailed block diagram of an exemplary embodiment of a flash card 126 of data storage system 120 of FIG. 1A. Flash card 126 includes a gateway 130 that serves as an interface between flash card 126 and RAID controllers 124. Gateway 130 is coupled to a general-purpose processor (GPP) 132, which can be configured (e.g., by program code) to perform pre-processing on IOPs received by gateway 130 and/or to schedule servicing of the IOPs by flash card 126. GPP 132 is coupled to a GPP memory 134 (e.g., Dynamic Random Access Memory (DRAM)) that can conveniently buffer data created, referenced and/or modified by GPP 132 in the course of its processing or data flowing through the gateway 130 destined for one or more of the flash controllers 140.

Gateway 130 is further coupled to multiple flash controllers 140, each of which controls a respective NAND flash memory system 150. Flash controllers 140 can be implemented, for example, by an Application Specific Integrated Circuit (ASIC) and/or an Field Programmable Gate Array (FPGA) and/or microprocessor having an associated flash controller memory 142 (e.g., DRAM). In embodiments in which flash controllers 140 are implemented with an FPGA, GPP 132 may program and configure flash controllers 140 during start-up of data storage system 120. After startup, in general operation flash controllers 140 receive read and write IOPs from gateway 130 that request to read data stored in NAND flash memory system 150 and/or to store data in NAND flash memory system 150. Flash controllers 140 service these IOPs, for example, by accessing NAND flash memory system 150 to read or write the requested data from or into NAND flash memory system 150 or by accessing a memory cache (not illustrated) associated with NAND flash memory system 150.

Flash controllers 140 implement a flash translation layer (FTL) that provides logical-to-physical address translation to enable access to specific memory locations within NAND flash memory systems 150. In general, an IOP received by flash controller 140 from a host device, such as a processor system 102, contains the logical block address (LBA) at which the data is to be accessed (read or written) and, if a write IOP, the write data to be stored to data storage system 120. The IOP may also specify the amount (or size) of the data to be accessed. Other information may also be communicated depending on the protocol and features supported by data storage system 120. The flash translation layer translates LBAs received from a RAID controller 124 into physical addresses assigned to corresponding physical location in NAND flash memory systems 150. Flash controllers 140 may perform address translation and/or store mappings between logical and physical addresses in a logical-to-physical translation data structure, such as a logical-to-physical translation table (LPT), which may conveniently be stored in flash controller memory 142.

NAND flash memory systems 150 may take many forms in various embodiments. In the embodiment shown in FIG. 1B, each NAND flash memory system 150 includes multiple (e.g., 32) individually addressable NAND flash memory storage devices 152. In the illustrated example, the flash memory storage devices 152 take the form of a board-mounted flash memory modules, for example, Single Level Cell (SLC), Multi-Level Cell (MLC), Three Level Cell (TLC), or Quad Level Cell (QLC) NAND flash memory modules.

Figure 2:
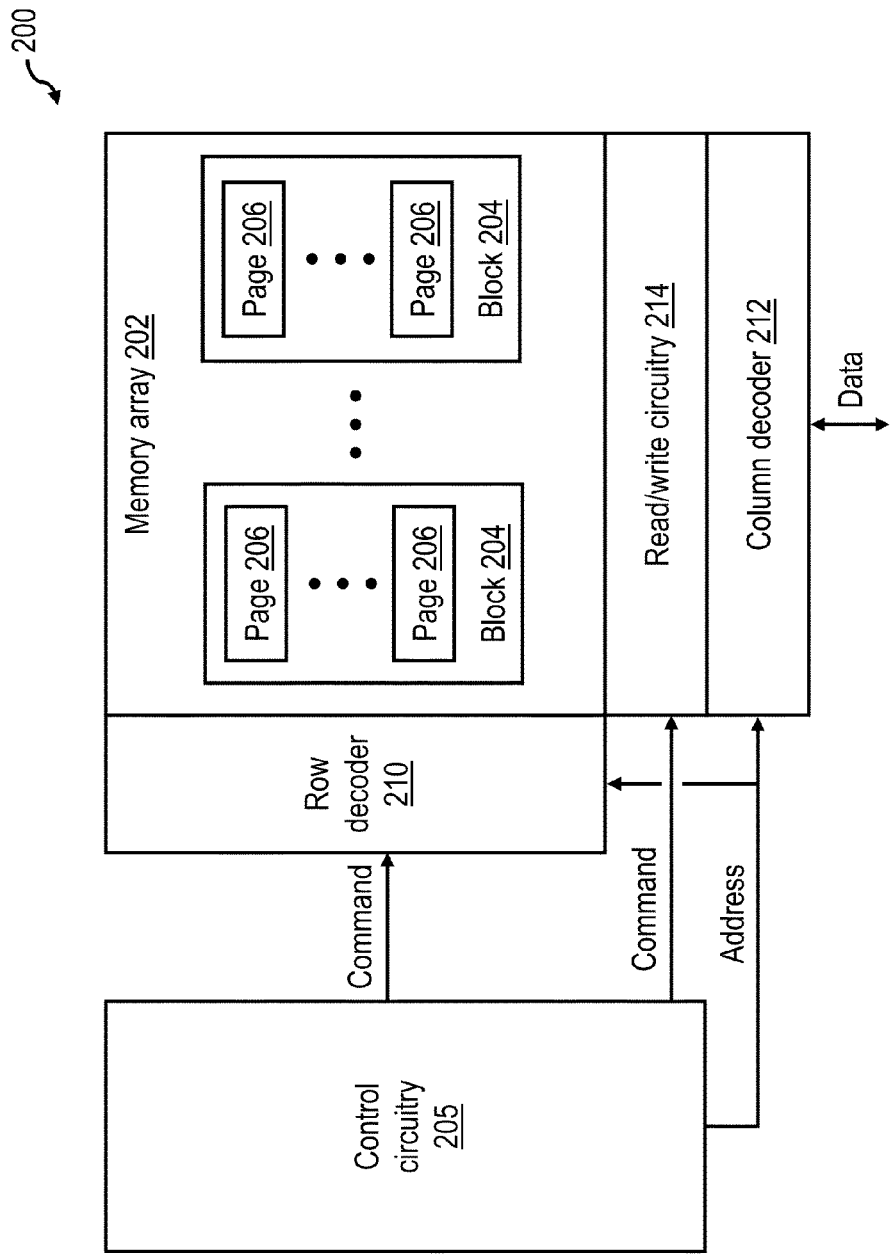
FIG. 2 depicts an exemplary NAND flash memory module in accordance with one embodiment.

Referring now to FIG. 2, there is depicted a block diagram of an exemplary flash memory module 200 that can be utilized to implement any of the NAND flash memory storage devices 152 of FIG. 1B. Flash memory module 200 includes one or more memory die, each implementing at least one memory array 202 formed of a two- or three-dimensional array of NAND flash memory cells. As indicated in FIG. 2, the memory cells within memory array 202 are physically arranged in multiple blocks 204, each in turn including multiple physical pages 206.

As is known to those skilled in the art, NAND flash memory, such as that employed in memory array 202, must be erased prior to being programmed. Further, NAND flash memory is generally constrained by its construction such that the smallest granule of storage that can be erased is a block 204 and the smallest granule of storage that can be accessed by a read or write IOP is fixed at the size of a single physical page 206. It should be appreciated in this regard that the LBAs provided by host devices correspond to logical pages within a logical address space, where each logical page typically has a size of 4 kilobytes. Physical pages 206, in contrast, typically have a larger size, for example, approximately 16 kilobytes (kB), and can thus correspond to multiple logical pages.

Flash memory module 200 further includes a row decoder 210 through which word lines of memory array 202 can be addressed and a column decoder 212 through which bit lines of memory array 202 can be addressed. In addition, flash memory module 200 includes read/write circuitry 214 that enables the memory cells of a physical page 206 to be programmed or read in parallel. Flash controller 200 additionally includes control circuitry 205 that provides chip-level control of operation of memory array 202, including read and write accesses made to physical pages 206 in memory array 202, erasure of blocks 204, and the amplitude, duration and polarity of related voltages applied to memory array 202.

Having described the general physical structure of one exemplary embodiment of a data storage system 120, certain operational aspects of data storage system 120 are now described with reference to FIG. 3, which is a high level flow diagram of the flash management functions and data structures employed by a GPP 132 and/or flash controller 140 in accordance with one embodiment.

Data storage system 120 does not generally allow external devices to directly address and/or access the physical memory locations within NAND flash memory systems 150. Instead, data storage system 120 is generally configured to present one or more logical volumes each having a contiguous logical address space to the external devices, thus allowing host devices to read and write data to and from LBAs within the logical address space while permitting one or more of the various levels of controllers (e.g., system management controller 123, RAID controllers 124, flash controllers 140 and GPP 132) to control where the data that is associated with the various LBAs actually resides in the physical memory locations comprising NAND flash memory systems 150. In this manner, performance and longevity of NAND flash memory systems 150 can be intelligently managed and optimized. In the illustrated embodiment, each flash controller 140 performs logical-to-physical address translation using a logical-to-physical address translation data structure, such as logical-to-physical translation (LPT) table 300, which can be stored, for example, in the associated flash controller memory 142.

Flash management code running on the GPP 132 tracks erased blocks of NAND flash memory system 150 that are ready to be used in ready-to-use (RTU) queues 306, which may be stored, for example, in GPP memory 134. In the depicted embodiment, flash management code running on the GPP 132 maintains one RTU queue 306 per channel (i.e., per data bus), and an identifier of each erased block that is to be reused is enqueued in the RTU queue 306 corresponding to its channel. A build block stripes function 320 performed by flash management code running on the GPP 132 constructs new block stripes for storing data and associated parity information from the erased blocks enqueued in RTU queues 306. The new block stripes are then queued to the flash controller 132 for data placement. Block stripes are preferably formed of blocks residing in different channels, meaning that build block stripes function 320 can conveniently construct a block stripe by drawing each block of the new block stripe from a different RTU queue 306. In general, build block stripes function 320 attempts to construct stripes from blocks of approximately equal health (i.e., expected remaining useful life).

In response to write IOP received from a host, such as a processor system 102, a data placement function 310 of flash controller 140 determines by reference to LPT table 300 whether the target LBA(s) indicated in the write request is/are currently mapped to physical memory page(s) in NAND flash memory system 150 and, if so, changes the status of each data page currently associated with a target LBA to indicate that it is no longer valid. In addition, data placement function 310 allocates a page stripe if necessary to store the write data of the write IOP and any non-updated data (i.e., in case the write request is smaller than a logical page, there is still valid data which needs to be handled in a read-modify-write manner) from an existing page stripe, if any, targeted by the write IOP, and/or stores the write data of the write IOP and any non-updated (i.e., still valid) data from an existing page stripe, if any, targeted by the write IOP to an already allocated page stripe which has free space left. The page stripe may be allocated from either a block stripe already allocated to hold data or from a new block stripe built by build block stripes function 320. In a preferred embodiment, the page stripe allocation can be based on the health of the blocks available for allocation and the "heat" (i.e., estimated or measured access frequency) of the LBA of the write data. Data placement function 310 then writes the write data, associated metadata (e.g., cyclic redundancy code (CRC) and error correcting code (ECC) values), and parity information for the page stripe in the allocated page stripe. Flash controller 140 also updates LPT table 300 to associate the physical page(s) utilized to store the write data with the LBA(s) indicated by the host device. Thereafter, flash controller 140 can access the data to service host read IOPs by reference to LPT table 300 as further illustrated in FIG. 3.

Once all pages in a block stripe have been written, flash controller 140 places the block stripe into one of occupied block queues 302, which flash management code running on the GPP 132 utilizes to facilitate garbage collection. As noted above, through the write process, pages are invalidated, and therefore portions of the NAND flash memory system 150 become unused. The associated flash controller 140 (and/or GPP 132) eventually needs to reclaim this space through garbage collection performed by a garbage collector 312. Garbage collector 312 selects particular block stripes for garbage collection based on a number of factors including, for example, the health of the blocks within the block stripes and how much of the data within the erase blocks is invalid. In the illustrated example, garbage collection is performed on entire block stripes, and flash management code running on GPP 132 logs the block stripes ready to be recycled in a relocation queue 304, which can conveniently be implemented in the associated flash controller memory 142 or GPP memory 134.

The flash management functions performed by GPP 132 or flash controller 140 additionally include a relocation function 314 that relocates the data held in block stripes enqueued in relocation queue 304. To relocate such data, relocation function 314 updates LPT table 300 to remove the current association between the logical and physical addresses of the data. In addition, relocation function 314 issues relocation write requests to data placement function 310 to request that the data of the old block stripe be written to a new block stripe in NAND flash memory system 150. Once all still valid data has been moved from the old block stripe, the old block stripe is passed to dissolve block stripes function 316, which decomposes the old block stripe into its constituent blocks, thus disassociating the blocks. Each of the blocks formerly forming the dissolved block stripe is then erased under the direction of flash controller 140 and/or the control circuitry 205 of the relevant flash memory module 200, and a corresponding program/erase (P/E) cycle count for each erased block is incremented. Based on the health metrics of each erased block (e.g., bit error rate (BER)

metrics, uncorrectable errors, P/E cycle count, etc.), each erased block is either retired (i.e., withdrawn from use) by a block retirement function 318 among the flash management functions executed on GPP 132, or alternatively, prepared for reuse by placing the block on the appropriate ready-to-use (RTU) queue 306 in the associated GPP memory 134.

Figure 3:
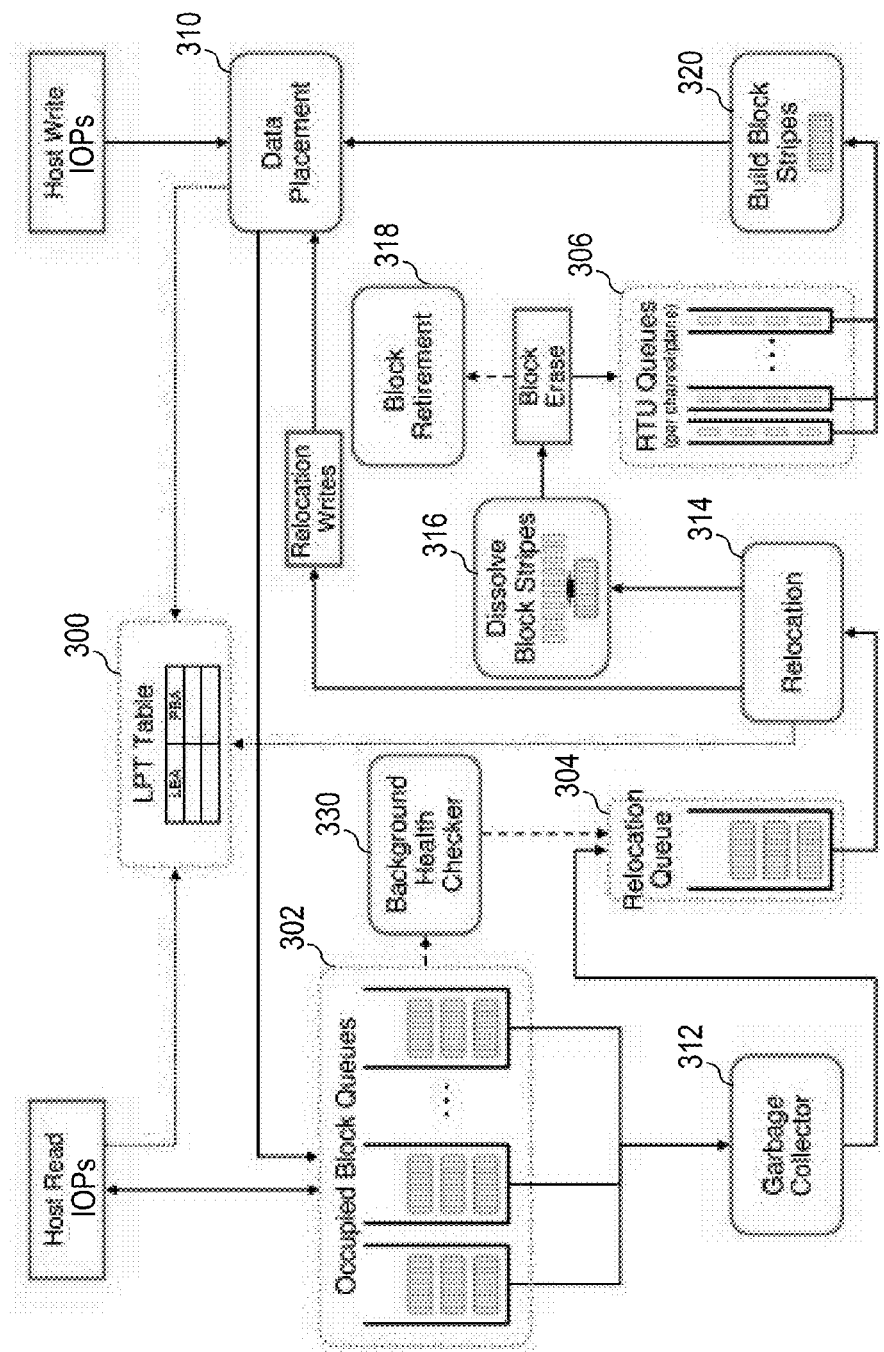
FIG. 3 is a high level flow diagram of the flash management functions and data structures employed in flash management in accordance with one embodiment.

As further shown in FIG. 3, the flash management functions executed on GPP 132 and/or flash controller 140 additionally include a background health checker 330. Background health checker 330, which operates independently of the demand read and write IOPs of hosts such as processor systems 102, continuously determines one or more metrics of health for blocks belonging to block stripes recorded in occupied block queues 302. Based on the one or more of the health metrics, background health checker 330 places block stripes on relocation queue 304 for handling by relocation function 314. Key health metrics preferably monitored and recorded by background health checker relate to the bit error rate (BER) metrics observed for valid blocks and physical pages, and may include, for example, the worst page BER of each block, the mean page BER of each block, the rates of change of the worst page BER and mean page BER of each block, etc.

Figure 4:
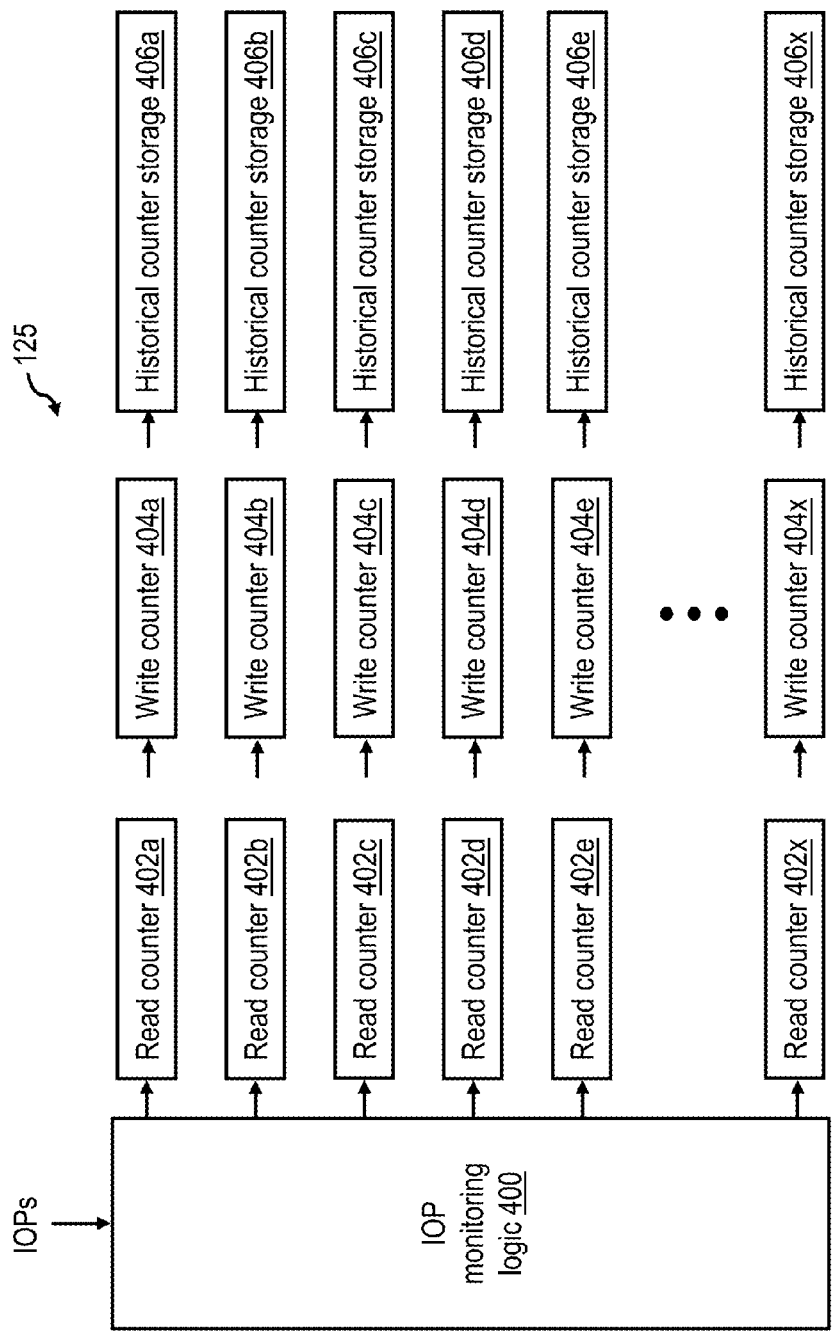
FIG. 4 illustrates a IOP monitor within a system management controller in accordance with one embodiment.

Referring now to FIG. 4, there is depicted a more detailed view of one exemplary embodiment of the IOP monitor (IM) 125 implemented within a system management controller 123. In the illustrated embodiment, IOP monitor 125 includes IOP monitoring logic 400 that detects each read and write IOP received by data storage system 120 and tracks the latencies (response times) of the IOPs. IOP monitor 125 further includes a plurality of read counters 402a-402x and a plurality of write counters 404a-404x, where each pair of counters (e.g., read counter 402a and write counter 404a) is associated with a respective one of a plurality of LBA ranges (or extents). IOP monitoring logic 400 records in each pair of counters 402, 404 the number of read IOPs and the number of write IOPs received by data storage system 120 that target the associated LBA range during the current monitoring interval, which in various implementations may be configurable and may be, for example, 5, 15, 30, or 60 minutes. IOP monitor 125 preferably further includes historical counter storage 406a-406x, in which IOP monitoring logic 400 stores values of read counters 402 and write counters 404 from the prior n (where n is a positive integer) monitoring intervals. As will be appreciated, the number of counters maintained by system management controllers 123 can vary between implementations based on, for example, a desired level of address granularity, the amount of storage available for or allocated to counters 125, and the size of the logical address space supported by data storage system 120. Thus, for example, in one implementation, the size of the LBA ranges may be 1 MB, while in another implementation, the size of the LBA ranges may be 1 GB. By examining the values recorded in read counters 402a-402x, write counters 404a-404x, and historical counter storage 406a-406x, a system management controller 123 can determine which LBA ranges are relatively more frequently accessed (i.e., "hotter") for read accesses and which LBA ranges are relatively more frequently accessed for write accesses. In addition, the system management controller 123 can calculate a variety of additional statistics regarding read and write IOPs, such as mean count values, standard deviation of count values, increases and/or decreases in count values, and recent rates of increase and/or decrease in count values.

Figure 5:
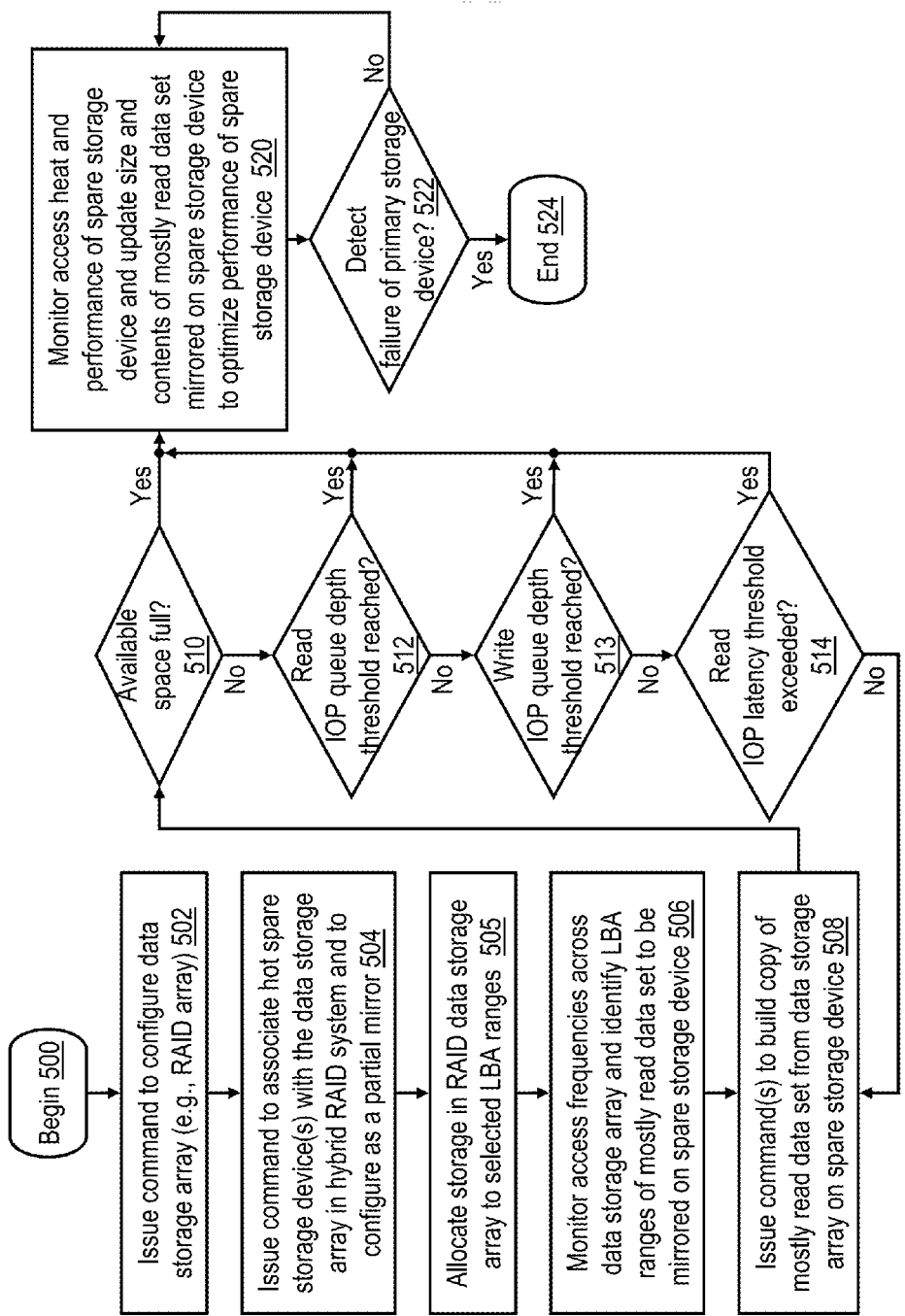
FIG. 5 is a high level logical flowchart of an exemplary process for building a copy of a mostly read dataset on a hot spare storage device in accordance with one embodiment.

With reference now to FIG. 5, there is depicted a high level logical flowchart of an exemplary process for building a copy of a dataset having a lower associated wear (e.g., a mostly read dataset) on a hot spare storage device in accordance with one embodiment. The process begins at block 500 and the proceeds to block 502, which illustrates system management controller 123 issuing a command to one of RAID controllers 124 to configure multiple of flash cards 126 into a RAID data storage array. For example, in one embodiment, one or more flash cards 126 can form a logical "disk" or "data storage device," and multiple of such logical data storage devices are configured into a desired level of RAID. Although it is presently preferred for the RAID data storage array to implement a RAID level having higher availability, such as RAID 5 or RAID 6, it should be appreciated that any other RAID level, particularly RAID 0, RAID 3 or RAID 4, could alternatively be employed. The data storage devices selected for inclusion in the RAID data storage array are referred to herein as "primary" data storage devices.

The process proceeds from block 502 to block 504, which illustrates system management controller 123 issuing a command to the RAID controller 124 to associate a spare storage device (e.g., one or more additional flash cards 126 forming a logical "data storage device") with the RAID data storage array configured at block 502 to form a hybrid RAID system. This operation can be performed, for example, when data storage system 120 first begins operation after powering up, in response to replenishment of a spare storage device after repair/replacement of a defective primary data storage device, or at any time due operation of data storage system 120 at which the spare storage device is present and operable. In response to the command, RAID controller 124 establishes an initial maximum limit of how much data can be stored on the spare storage device (which may simply be the maximum useable capacity of the spare storage device). The remainder of the storage capacity is overprovisioned space used by the flash controller 140 to manage garbage collection and reclamation. This storage capacity is then configured as a mirror for a selected dataset within the RAID data storage array that has a lower relative wear, for example, a dataset that is frequently read but not frequently written. In addition, at block 505, system management controller 123 allocates storage on the primary storage devices of the RAID data storage array to selected LBA range(s). The allocation performed at block 505 may be in advance of demand (referred to as "thick provisioning") and/or on-demand (referred to as "thin provisioning"). It should be appreciated that although blocks 502-505 explicitly depict the configuration of only one hybrid RAID system within data storage system 120, in other embodiments system management controller 123 may direct the configuration of multiple independent hybrid RAID systems within data storage system 120.

Figure 6A:
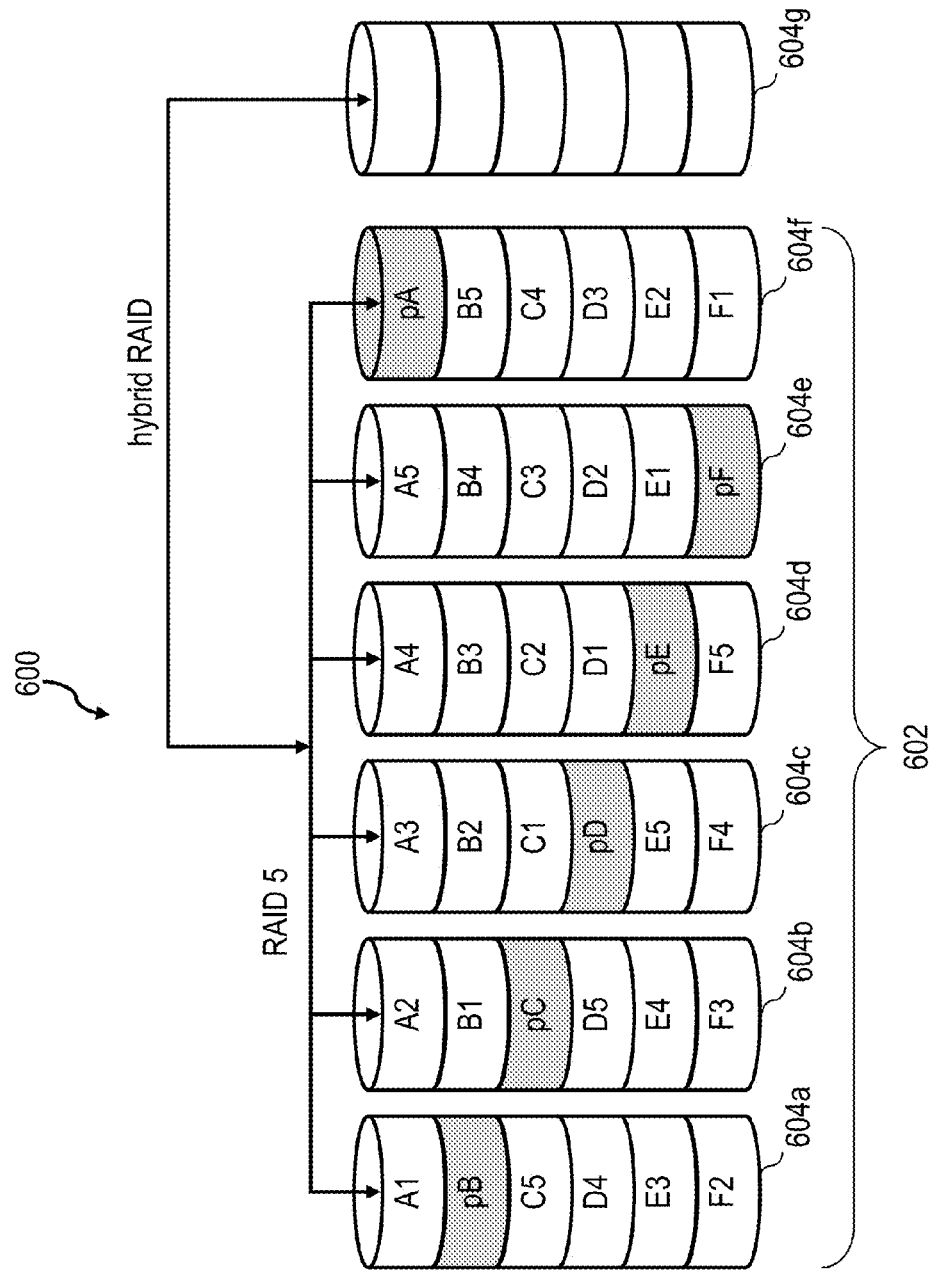
FIG. 6A illustrates an exemplary hybrid RAID system including a RAID 5 data storage array and a hot spare storage device in accordance with one embodiment.
Figure 7A:
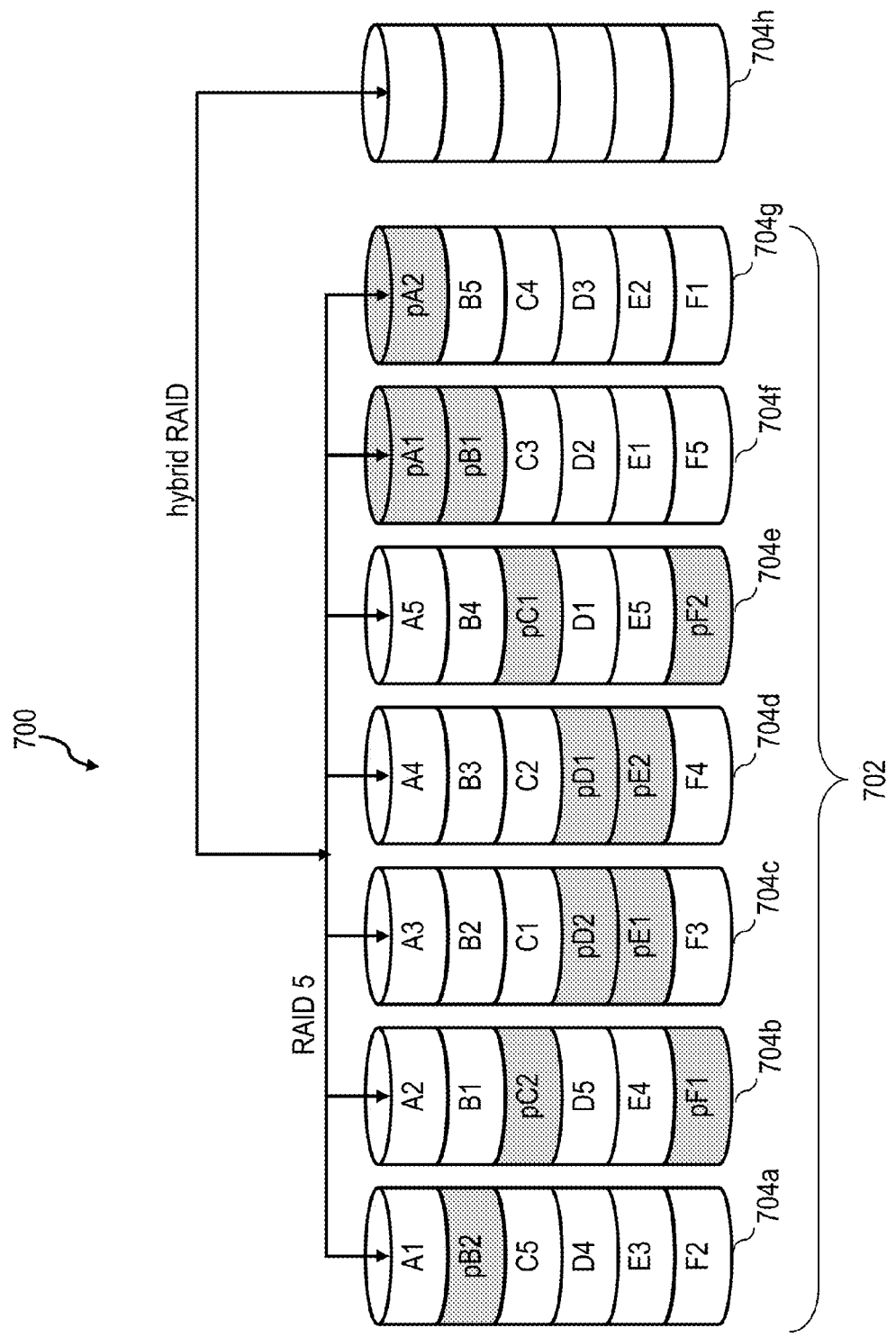
FIG. 7A depicts an exemplary hybrid RAID system including a RAID 6 data storage array and a hot spare storage device in accordance with one embodiment.

FIGS. 6A and 7A illustrate alternative implementations of a hybrid RAID system in data storage system 120 following the configuration performed at blocks 502-505 of FIG. 5. In particular, FIG. 6A illustrates a hybrid RAID system 600 including a RAID 5 data storage array 602 and a hot spare storage device 604g associated with RAID 5 storage array 602 in a hybrid RAID arrangement. RAID 5 storage array 602 further includes a plurality of (in this case, six) primary data storage devices 604a-604f. As is known in the art, RAID 5 data storage arrays employ block level striping with distributed parity. Accordingly, in this example, block stripes A-F, which each includes five data blocks numbered 1 to 5 (e.g., A1 . . . A5, B1 . . . B5, etc.) and a parity block (e.g., pA, pB, etc.), are striped across primary storage devices 604a-604f, with the parity blocks being distributed among the various primary storage devices 604a-604f.

FIG. 7A depicts an alternative hybrid RAID system 700 including a RAID 6 data storage array 702 and a hot spare storage device 704h associated with RAID 6 storage array 702 in a hybrid RAID arrangement. RAID 6 storage array 702 further includes a plurality of (in this case, seven) primary data storage devices 704a-704g. In this example, block stripes A-F, which each includes five data blocks numbered 1 to 5 (e.g., A1 ... A5, B1 ... B5, etc.) and two independent parity blocks (e.g., pA1 and pA2, pB1 and pB2, etc.), are striped across primary storage devices 704a-704g, with the parity blocks of each stripe being distributed among the various primary storage devices 704a-704g.

Returning to FIG. 5, the process proceeds from block 504 to block 506, which illustrates IOP monitor 125 of system management controller 123 monitoring read and write IOPs targeting LBAs within the various LBA address ranges supported by data storage system 120 utilizing read counters 402a-402x, write counters 404a-404x, and historical counter storage 406a-406x. In this manner, IOP monitor 125 records what LBA ranges have been frequently accessed by reads and write IOPs in both the current monitoring interval, as well as over prior monitoring intervals. Based on the monitoring performed by IOP monitor 125, system management controller 123 identifies frequently accessed LBA ranges that are read more often than written. In identifying these LBA ranges, system management controller 123 may consider read and write counter values from the current monitoring interval only, read and write counter values from the current monitoring interval and historical counter values, or solely historical counter values. If both counter values from the current monitoring interval and historical counter values are considered, system management controller 123 may weight more recent counter values more heavily in identifying LBA ranges that are read more often than written. Further, system management controller 123 may apply one or more thresholds to identify the LBA ranges. For example, in one embodiment, system management controller 123 may identify an LBA range for which the value of the associated read counter 402 in the current and/or prior monitoring interval(s) is greater than a first heat threshold, the value of the associated write counter 404 in the current and/or prior monitoring interval(s) is less than a second heat threshold, and the aggregate of the values of the read counter 402 and 404 is greater than a third heat threshold. In an alternative embodiment, system management controller 123 may identify an LBA range for which the difference between the values of the associated read counter 402 and write counter 404 in the current and/or prior monitoring interval(s) is greater than a fourth heat threshold. In yet other embodiments, other metrics can be employed to identify LBA ranges of interest.

In response to identification of the LBA ranges at block 506, system management controller 123 issues one or more commands to a RAID controller 124 to cause the RAID controller 124 to initiate copying of the dataset associated with the identified LBA ranges from the RAID data storage array onto the hot spare storage device while refraining from copying other data from the RAID data storage array onto the hot spare storage device. Those skilled in the art will appreciate that the RAID controller 124 will monitor incoming write IOPs to manage coherency, and any write IOPs that target the data being copied will either be stalled until the copy completes or be merged in with both copies in some fashion. In a preferred embodiment, system management controller 123 causes the data comprising the dataset to be copied to the hot spare storage device in descending order of priority, where the priority is based, for example, on the read "heat" determined for the current monitoring period and/or previous monitoring period(s). The granularity of data copying depends on how much memory is available in the system management controller 123 to store indexes. If the segment is very small (e.g., 4 kB), then only data that is truly hot can be copied to the spare storage device, but the storage capacity required to store the associated metadata (e.g., LBAs) of the data copied to the hot spare storage device will be high. Conversely, if the segment is large (e.g., 1 MB), then the amount of metadata will be small, but a significant amount of colder data can potentially also be copied to the hot spare storage device.

In the embodiment of FIG. 5, system management controller 123 continues to direct that the dataset be copied onto the hot spare storage device until one of four conditions depicted at blocks 510, 512, 513 and 514 is detected. In particular, at block 510 system management controller 123 determines whether or not the space available to store mirrored data on the hot spare storage device (i.e., the storage capacity remaining after over-provisioning) is full. If so, the process passes to block 520, which is described below. In response to a determination at block 510 that the space available to store mirrored data on the hot spare storage device is not full, the process proceeds from block 510 to block 512.

Block 512 depicts system management controller 123 determining whether or not a read IOP queue depth threshold for the hot spare storage device has been reached. In one preferred embodiment, system management controller 123 sets the read IOP queue depth threshold for the spare storage device (e.g., spare storage device 604g or 704h) such that, for any number of unserviced read IOPs pending in the queue of the hot spare storage device less than the read IOP queue depth threshold, the read IOP response time of the spare storage device is relatively constant and low. System management controller 123 preferably also updates the read IOP queue depth threshold periodically (e.g., once every monitoring period), if needed, in order to maintain a relatively constant read IOP response time. In response to a determination at block 512 by system management controller 123 that the read IOP queue depth threshold has been reached, the process proceeds to block 520, which is described below. However, in response to a determination at block 512 that the read IOP queue depth threshold has not been reached, the process proceeds to block 513.

Block 513 illustrates system management controller 123 determining whether or not a write IOP queue depth threshold for the hot spare storage device has been reached. In one preferred embodiment, system management controller 123 sets the write IOP queue depth threshold for the spare storage device (e.g., spare storage device 604g or 704h) to maintain a relatively low write IOP queue depth. System management controller 123 may also updates the write IOP queue depth threshold periodically (e.g., once every monitoring period), if needed, in order to maintain a relatively constant read IOP response time. In response to a determination at block 513 by system management controller 123 that the write IOP queue depth threshold has been reached, the process proceeds to block 520, which is described below. However, in response to a determination at block 513 that the read IOP queue depth threshold has not been reached, the process proceeds to block 514.

Block 514 illustrates system management controller 123 determining whether or not a selected read IOP latency threshold for the spare storage device has been exceeded.

For example, the read IOP latency threshold can relate to the mean read IOP latency or the worst case read IOP latency over a monitoring period. In response to system management controller 123 determining at block 514 that the read IOP latency threshold has not been exceeded, the process of FIG. 5 returns to block 508, illustrating that system management controller 123 continues to issue commands to cause the mostly read dataset to be copied from the primary data storage devices of the RAID data storage array onto the hot spare storage device. If, however, system management controller 123 determines at block 514 that the read IOP latency threshold has been exceeded, the process of FIG. 5 passes to block 520.

Figure 6B:
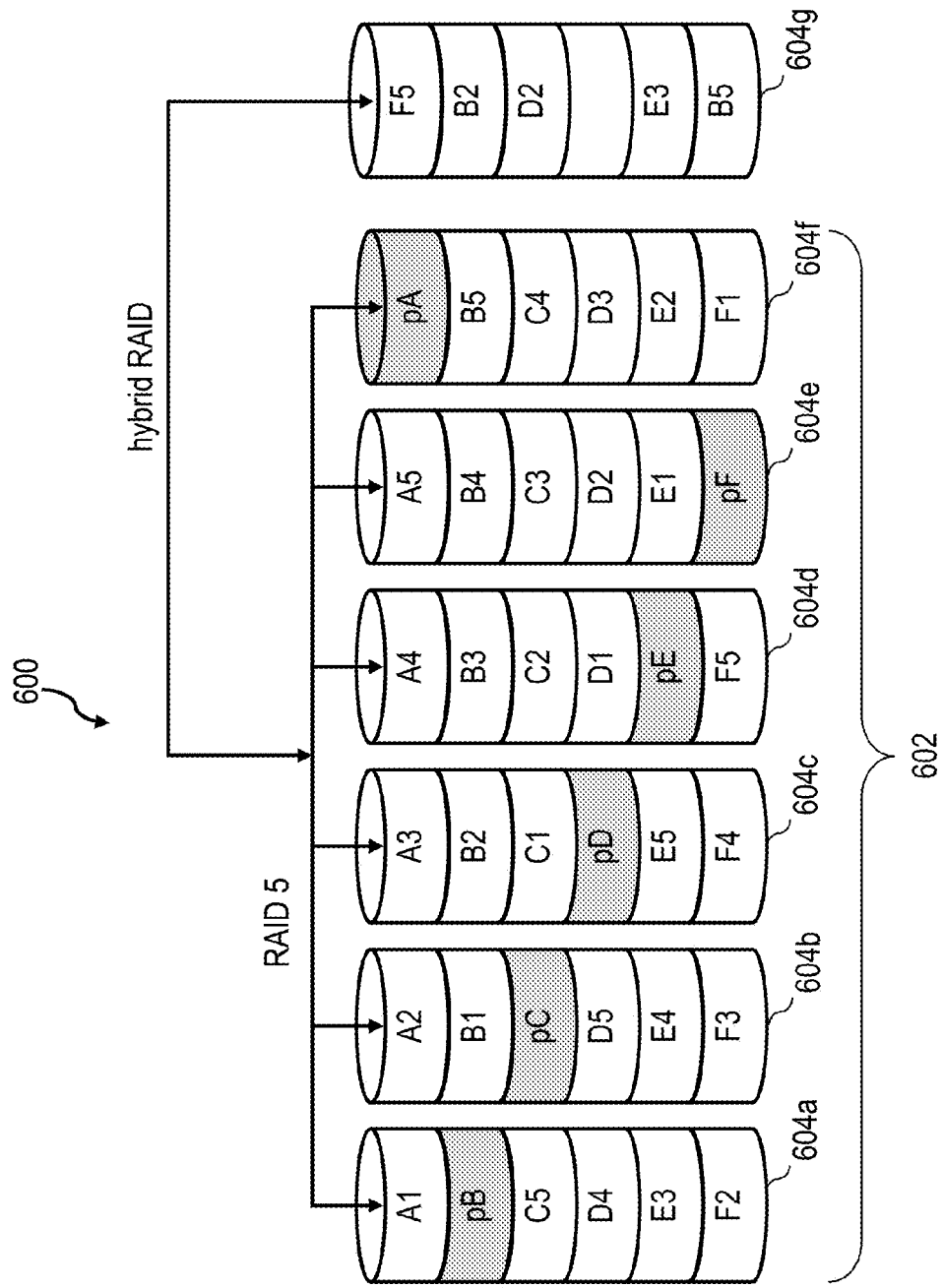
FIG. 6B depicts the exemplary hybrid RAID system of FIG. 6A with a copy of a mostly read dataset maintained on a hot spare storage device in accordance with one embodiment.
Figure 7B:
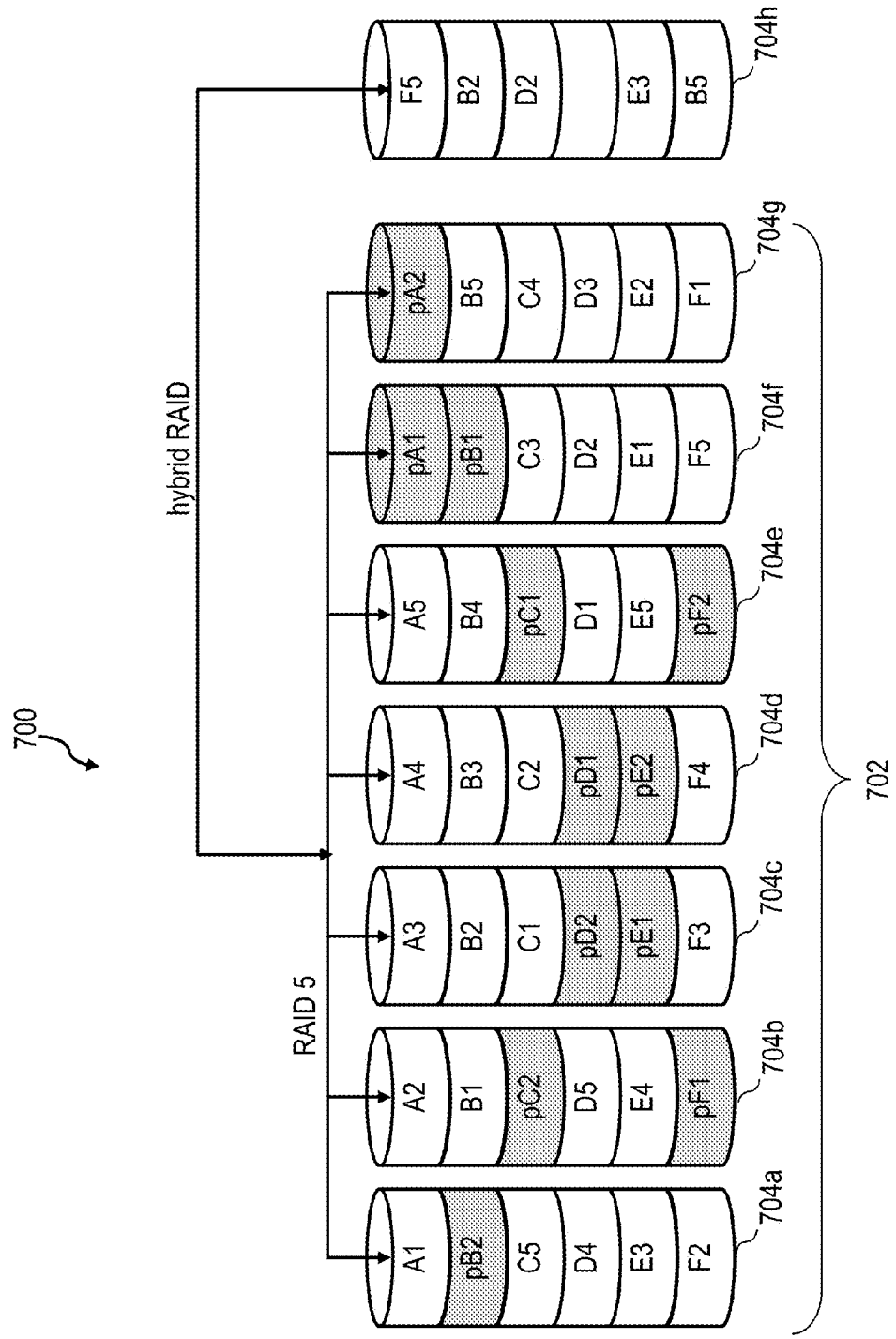
FIG. 7B depicts the exemplary hybrid RAID system of FIG. 7A with a copy of a mostly read dataset maintained on a hot spare storage device in accordance with one embodiment.

Thus, the process of FIG. 5 passing from any of blocks 510, 512, 513 or 514 to block 520 represents system management controller 123 ending the initial process of building the copy of the dataset on the spare storage device and beginning to maintain and update the dataset. This point in time is illustrated in FIGS. 6B and 7B, which respectively depict the exemplary hybrid RAID systems of FIGS. 6A and 7A with a copy of a mostly read dataset residing on the hot spare storage device. In these examples, the mostly read dataset created on spare storage devices 604g and 704h includes data block F5, B2, D2, E3 and B5. It should be noted in these examples, that less than all of the available storage capacity of spare storage devices 604g and 704h is utilized to store the mostly read dataset.

Referring now specifically to block 520 of FIG. 5, after a system management controller 123 builds the copy of the mostly read dataset on the hot spare storage device, system management controller 123 repeatedly updates the mirrored dataset. These updates can be due to write IOPs received from the host(s) or due to updates based on monitoring performed by the system management controllers 123. In particular, system management controllers 123 continue to employ IOP monitors 125 to monitor access heat across the LBA ranges associated with the RAID data storage array (e.g., data storage array 602 or 702) to determine the data that should be mirrored on the hot spare storage drive (e.g., spare storage drive 604g or 704h) as described above with respect to block 506. Based on this monitoring, system management controller 123 repeatedly updates the contents of the dataset mirrored on the spare storage drive to remove data that is no longer hot or mostly read and to add data that becomes hot and mostly read. In repeatedly updating the contents of the dataset to reflect the hottest mostly read data, system management controller 123 preferably applies some level of historicity to the changes to the dataset to reduce thrashing. The system management controller preferably further limits such updates based on some predetermined maximum rate of writes so as to not interfere with system performance. At block 520, system management controller 123 also repeatedly updates the overall size of the dataset mirrored on the spared storage device based, for example, on the criteria illustrated at blocks 510, 512, 513 and 514. By updating the size and contents of the mostly read dataset mirrored on the spare storage device in this manner, performance of spare storage device in servicing read IOPs is optimized.

As indicated by decision block 522, the process shown at block 520 continues until a system management controller 123 detects a failure of a primary data storage device within the RAID data storage array. In response to detecting a failure of a primary data storage device within the RAID data storage array, the system management controller 123 ends the process of FIG. 5 and initiates the process of FIG. 9, which is described below.

Figure 8:
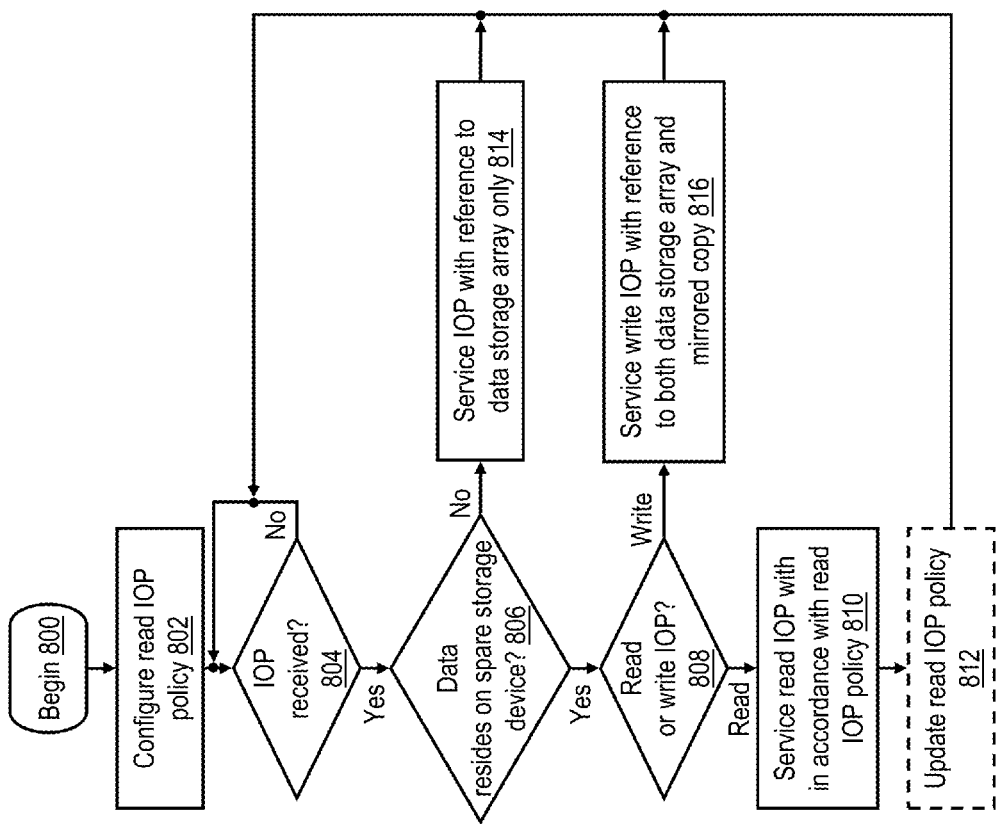
FIG. 8 is a high level logical flowchart of an exemplary process for servicing input/output operations (IOPs) in a data storage system including a data storage array and a hot spare storage device in accordance with one embodiment.

Referring now to FIG. 8, there is depicted a high level logical flowchart of an exemplary process for servicing IOPs in a hybrid RAID storage system including a RAID data storage array and a hot spare storage device. The process begins at block 800 and then proceeds to block 802, which illustrates a system management controller 123 configuring a read IOP policy for a hybrid RAID system, such as hybrid RAID system 600 or 700. For example, in one embodiment, the system management controller 123 can configure the read IOP policy by selecting the read IOP policy from among a plurality of alternative read IOP policies. These alternative read IOP policies can include servicing a read IOP targeting data residing on the hot spare storage device by:

issuing a read command to only the spare storage device;

issuing a read command to both the spare storage device and the data storage array, servicing the read IOP with data from the first read command to complete, and discarding data obtained by the other read command;

issuing a read command to the spare storage device if the IOP queue depth is less than a policy queue depth threshold and otherwise issuing the read command to the data storage array;

issuing the read command to the data storage array if the mean read IOP response time is less than a policy latency threshold and otherwise issuing the read command to the spare storage device;

issuing the read command to the spare storage device if the mean read IOP response time is less than a policy latency threshold and otherwise issuing the read command to the data storage array.

In at least some embodiments, system management controller 123 may select one of the plurality of alternative read IOP policies as shown at block 802 contemporaneously with configuration of the hybrid RAID data storage system at blocks 502-505 of FIG. 5.

Following block 802, system management controller 123 (e.g., utilizing IOP monitoring logic 400) determines at block 804 whether or not data storage system 120 has received an IOP that specifies an LBA mapped to the hybrid RAID storage system (e.g., hybrid RAID storage system 600 or 700). If not, the process of FIG. 8 iterates at block 804 until an IOP specifying an LBA mapped to the hybrid RAID storage system is received. In response to a determination at block 804 that data storage system 120 has received an IOP that specifies an LBA mapped to the hybrid RAID storage system, system management controller 123 further determines at block 806 whether or not data associated with the LBA of the IOP resides on the hot spare storage device. In response to a determination that data associated with the target LBA of the IOP does not reside on the hot spare data storage device, system management controller 123 directs that the IOP be serviced in a conventional manner by reference to only the RAID data storage array (block 814). Thereafter, the process of FIG. 8 returns to block 804.

However, in response to a determination at block 806 that data associated with the target LBA of the IOP resides on the hot spare storage device, system management controller 123 causes the IOP to be serviced in accordance with the type of the IOP, as indicated by decision block 808. In particular, if the IOP is a read IOP, system management controller 123 directs that the IOP be serviced as shown at block 810 and optional block 812. If, however, the IOP is a write IOP, system management controller 123 directs that the IOP be serviced as shown at block 816.

Referring now to block 810, if the IOP is a read IOP, the read IOP is serviced in accordance with the configured read IOP policy, as described above with reference to block 802. Thus, in servicing the read IOP, only the hot spare storage device may be accessed, only the RAID data storage array may be accessed, or both the hot spare storage device and the RAID data storage array may be accessed. System management controller 123 may also optionally update the read IOP policy, as shown at block 812. For example, system management controller 123 may update the read IOP policy to optimize one or more performance criteria of the hot spare storage device, including the overall IOP queue depth, the read IOP queue depth, and the read response time. Following block 812, the process of FIG. 8 returns to block 804.

Referring now to block 816, if the IOP is a write IOP, system management controller 123 directs that the write IOP be serviced with reference to both the RAID data storage array and the hot spare storage device. That is, the write data specified by the write IOP is utilized to update both the hot spare storage device and the RAID data storage array. Thereafter, the process of FIG. 8 returns to block 804.

Figure 9:
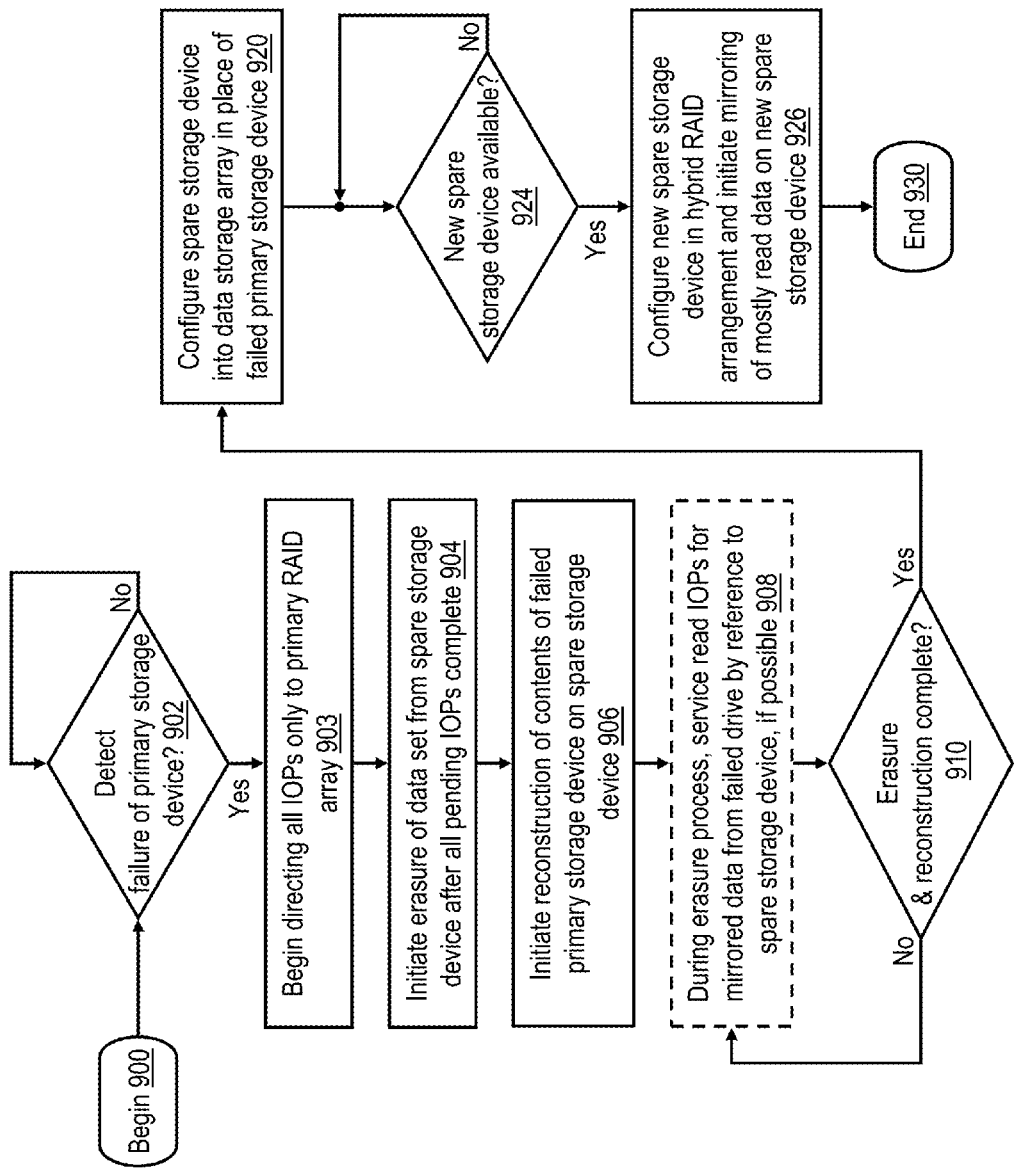
FIG. 9 is a high level logical flowchart of an exemplary process for rebuilding a data storage array utilizing a hot spare storage device in accordance with one embodiment.

With reference now to FIG. 9, there is illustrated a high level logical flowchart of an exemplary process for rebuilding a data storage array utilizing a hot spare storage device in accordance with one embodiment. The process begins at block 900 and then proceeds to block 902, which depicts system management controller 123 determining whether or not a failure of a primary data storage device (e.g., one of primary data storage devices 604a-604f or 704a-704g) within the RAID data storage array has been detected. If not, the process of FIG. 9 continues to iterate at block 902.

In response to a determination at block 902 that a failure of a primary data storage device (e.g., one of primary data storage devices 604 or 704) within the RAID data storage array has been detected, the process proceeds to block 903, which illustrates system management controller 123 beginning to direct all read and write IOPs to the primary RAID data storage array 602, 702 rather than to the hot spare storage device 604g, 704h. In some embodiments, system management controller 123 can accomplish this by marking (or deleting) the metadata associated with the contents of the hot spare storage device. In a preferred embodiment, system management controller 123 then trims the hot spare storage device by erasing all blocks that had been used for mirroring the hot mostly read dataset. In an alternative embodiment, all the data on the hot spare storage device is invalidated by marking the relevant logical-to-physical table entries invalid and then simply relying on the garbage collection process of the flash controllers 140, as described above. If the hot spare storage device is to be erased then at block 904, system management controller 123 initiates erasure of the mirrored dataset from the hot spare storage device (e.g., spare storage device 604g or 704h) to prepare the hot spare storage device for reprogramming after all pending read and write IOPs directed to the hot spare storage device for servicing have completed. In a preferred embodiment, the erasure begins with data blocks mirroring those residing on the still operative (i.e., non-failed) primary storage devices. Data blocks copied from the failed primary storage device are preferably not marked invalid nor erased from the hot spare storage device, as these blocks would otherwise have to be rebuilt from the other data blocks and parity blocks residing on the operative primary storage devices.

As illustrated at block 906, system management controller 123 also initiates reconstruction of the contents of the failed primary storage device within the unused and erased portions of the hot spare storage device, for example, from the data blocks and parity block(s) of the block stripes residing on the operative primary storage devices. As noted above, the mirrored data blocks from the failed primary storage device that already reside on the hot spare storage device need not be rebuilt, but may be relocated, as desired, on the hot spare storage device.

In one embodiment, system management controller 123 modifies the read IOP policy such that, during the reconstruction of the failed primary storage device, all read IOPs are handled by reference to the RAID data storage array. In an alternative embodiment illustrated at optional block 908, during the reconstruction of the failed primary storage device, system management controller 123 may direct that read IOP targeting mirrored data that has not been erased from the hot spare storage device can still be serviced by accessing the hot spare storage device. Servicing such read IOPs utilizing the hot spare storage device results in greatly improved response times because the target data need not be rebuilt from the operative primary storage devices of the RAID data storage array.

At block 910, system management controller 123 determines whether or not the erasure of the dataset initiated at block 904 and the reconstruction of the contents of the failed primary storage device that was initiated at block 906 have both completed. If not, the process of FIG. 9 iterates at optional block 908 and block 910. If, however, system management controller 123 determines at block 910 that both the erasure and reconstruction processes have completed, system management controller 123 configures the hot spare storage device into the RAID data storage array in place of the failed primary storage device (block 920). In addition, as indicated at blocks 924 and 926, if a new spare storage device become available (e.g., due to installation of additional flash card(s) 126 or conversion of a cold spare to a hot spare), system management controller 123 configures the new hot spare storage device in a hybrid RAID arrangement with the RAID data storage array and initiates mirroring of a mostly read dataset on the new hot spare storage device, as described above with reference to FIG. 5. Thereafter, the process of FIG. 9 ends at block 930.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As has been described, in at least one embodiment, a data storage system includes a controller, a spare storage device, and a plurality of primary storage devices across which a data storage array is distributed. The controller monitors access frequencies of address ranges mapped to the data storage system. Based on the monitoring, the controller identifies frequently accessed ones of the address ranges that have lower associated wear, for example, those that are read more often than written. In response to the identifying, the controller initiates copying of a dataset associated with the identified address ranges from the data storage array onto the spare storage device while refraining from copying other data from the data storage array onto the spare storage device. The controller directs read input/output operations (IOPs) targeting the identified address ranges to be serviced by access to the spare storage device. In response to a failure of a failed storage device among the plurality of primary storage devices, the controller rebuilds contents of the failed storage device on the spare storage device in place of the dataset associated with the identified address ranges. By selectively utilizing the spare storage device to hold a dataset that is predominately read, utilization of the spare storage device is optimized.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude transitory propagating media per se.

In addition, although embodiments have been described that include use of a NAND flash memory, it should be appreciated that embodiments of the present invention can also be used with any other type of non-volatile random access memory (NVRAM).

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method in a data storage system including a controller, a spare storage device and a plurality of primary storage devices, the method comprising:
    storing a data storage array distributed across the plurality of primary storage devices, wherein each of the plurality of primary storage devices and the spare storage device contains a plurality of blocks of physical storage;
    the controller monitoring access frequencies of address ranges mapped to the data storage array;
    based on the monitoring, the controller identifying frequently accessed address ranges that are read more often than written;
    in response to the identifying, the controller initiating copying of a dataset associated with the identified address ranges from the data storage array onto the spare storage device while refraining from copying other data from the data storage array onto the spare storage device;
    the controller directing read input/output operations (IOPs) targeting the identified address ranges to be serviced by access to the spare storage device;
    the controller resizing the dataset based on at least one of a set including a number of pending IOPs to be serviced by the spare storage device and a response time of an IOP serviced by accessing the spare storage device; and
    in response to a failure of a failed storage device among the plurality of primary storage devices, rebuilding contents of the failed storage device on the spare storage device in place of the dataset associated with the identified address ranges.

2. The method of claim 1, and further comprising:
    the controller ending copying of the data associated with the identified address ranges prior to the spare storage device becoming full based on at least a response time of an IOP serviced by accessing the spare storage device.

3. The method of claim 2, wherein the ending copying further comprises the controller ending copying of the data associated with the identified address ranges prior to the spare storage device becoming full based on a number of pending IOPs to be serviced by accessing the spare storage device.

4. The method of claim 1, and further comprising:
    based on the monitoring of access frequencies of address ranges mapped to the data storage array, the controller repeatedly updating the identified address ranges and the dataset on the spare storage device.

5. The method of claim 1, wherein:
    the method further comprises the controller determining whether to service read IOPs requesting data within the dataset by reference to the spare storage device based on a read IOP policy;
    wherein the controller performs the directing for those read IOPs for which the read IOP policy indicates are to be serviced by reference to the spare storage device.

6. The method of claim 5, and further comprising:
    in response to a read IOP targeting a particular data granule within the dataset, the controller initiating concurrent retrieval of the particular data granule from both the data storage array and the spare storage device and cancelling retrieval of the particular data granule from one of the data storage array and the spare storage device based on the read IOP policy.

7. A method in a data storage system including a controller, a spare storage device and a plurality of primary storage devices, the method comprising:
    storing a data storage array distributed across the plurality of primary storage devices, wherein each of the plurality of primary storage devices and the spare storage device contains a plurality of blocks of physical storage;
    the controller monitoring access frequencies of address ranges mapped to the data storage array;
    based on the monitoring, the controller identifying frequently accessed address ranges that are read more often than written;
    in response to the identifying, the controller initiating copying of a dataset associated with the identified address ranges from the data storage array onto the spare storage device while refraining from copying other data from the data storage array onto the spare storage device;
    the controller directing read input/output operations (IOPs) targeting the identified address ranges to be serviced by access to the spare storage device; and
    in response to a failure of a failed storage device among the plurality of primary storage devices, rebuilding contents of the failed storage device on the spare storage device in place of the dataset associated with the identified address ranges, wherein the rebuilding includes:
        initiating an invalidate and erasure process to invalidate all entries no longer to be used and erase blocks no longer valid from the spare storage device; and
        during the erasure process, the controller directing servicing of an IOP targeting data in the dataset by reference to the spare storage device.

8. A data storage system, comprising:
a controller configured to be coupled to a spare storage device and to a plurality of primary storage devices across which a data storage array is distributed, wherein each of the plurality of primary storage devices and the spare storage device contains a plurality of blocks of physical storage, and wherein the controller is configured to perform:
the controller monitoring access frequencies of address ranges mapped to the data storage array;
based on the monitoring, the controller identifying frequently accessed address ranges that are read more often than written;
in response to the identifying, the controller initiating copying of a dataset associated with the identified address ranges from the data storage array onto the spare storage device while refraining from copying other data from the data storage array onto the spare storage device;
the controller directing read input/output operations (IOPs) targeting the identified address ranges to be serviced by access to the spare storage device;
the controller resizing the dataset based on at least one of a set including a number of pending IOPs to be serviced by the spare storage device and a response time of an IOP serviced by accessing the spare storage device; and
in response to a failure of a failed storage device among the plurality of primary storage devices, rebuilding contents of the failed storage device on the spare storage device in place of the dataset associated with the identified address ranges.

9. The data storage system of claim 8, wherein the controller is further configured to perform:
the controller ending copying of the data associated with the identified address ranges prior to the spare storage device becoming full based on at least a response time of an IOP serviced by accessing the spare storage device.

10. The data storage system of claim 9, wherein the controller ends copying of the data associated with the identified address ranges prior to the spare storage device becoming full based on a number of pending IOPs to be serviced by accessing the spare storage device.

11. The data storage system of claim 8, wherein the controller is further configured to perform:
based on the monitoring of access frequencies of address ranges mapped to the data storage array, the controller repeatedly updating the identified address ranges and the dataset on the spare storage device.

12. The data storage system of claim 8, wherein:
the controller is further configured to perform determining whether to service read IOPs requesting data within the dataset by reference to the spare storage device based on a read IOP policy;
wherein the controller performs the directing for those read IOPs for which the read IOP policy indicates are to be serviced by reference to the spare storage device.

13. The data storage system of claim 12, wherein the controller is further configured to perform:
in response to a read IOP targeting a particular data granule within the dataset, the controller initiating concurrent retrieval of the particular data granule from both the data storage array and the spare storage device and cancelling retrieval of the particular data granule from one of the data storage array and the spare storage device based on the read IOP policy.

14. The data storage system of claim 8, and further comprising the spare storage device and the plurality of primary storage devices.

15. A data storage system, comprising:
a controller configured to be coupled to a spare storage device and to a plurality of primary storage devices across which a data storage array is distributed, wherein each of the plurality of primary storage devices and the spare storage device contains a plurality of blocks of physical storage, and wherein the controller is configured to perform:
the controller monitoring access frequencies of address ranges mapped to the data storage array;
based on the monitoring, the controller identifying frequently accessed address ranges that are read more often than written;
in response to the identifying, the controller initiating copying of a dataset associated with the identified address ranges from the data storage array onto the spare storage device while refraining from copying other data from the data storage array onto the spare storage device;
the controller directing read input/output operations (IOPs) targeting the identified address ranges to be serviced by access to the spare storage device; and
in response to a failure of a failed storage device among the plurality of primary storage devices, rebuilding contents of the failed storage device on the spare storage device in place of the dataset associated with the identified address ranges, wherein the rebuilding includes:
initiating an invalidate and erasure process to invalidate all entries no longer to be used and erase blocks no longer valid from the spare storage device; and
during the erasure process, the controller directing servicing of an IOP targeting data in the dataset by reference to the spare storage device.

16. A program product, comprising:
a storage device; and
program code stored in the storage device, wherein the program code, when executed by a controller configured to be coupled to a spare storage device and to a plurality of primary storage devices across which a data storage array is distributed, causes the controller to perform:
the controller monitoring access frequencies of address ranges mapped to the data storage array;
based on the monitoring, the controller identifying frequently accessed address ranges that are read more often than written;
in response to the identifying, the controller initiating copying of a dataset associated with the identified address ranges from the data storage array onto the spare storage device while refraining from copying other data from the data storage array onto the spare storage device;
the controller directing read input/output operations (IOPs) targeting the identified address ranges to be serviced by access to the spare storage device;
the controller resizing the dataset based on at least one of a set including a number of pending IOPs to be serviced by the spare storage device and a response time of an IOP serviced by accessing the spare storage device; and
in response to a failure of a failed storage device among the plurality of primary storage devices, rebuilding contents of the failed storage device on the spare storage device in place of the dataset associated with the identified address ranges.

17. The program product of claim 16, wherein the program code, when executed by the controller, causes the controller to perform:
the controller ending copying of the data associated with the identified address ranges prior to the spare storage device becoming full based on at least a response time of an IOP serviced by accessing the spare storage device.

18. The program product of claim 17, wherein the controller ends copying of the data associated with the identified address ranges prior to the spare storage device becoming full based on a number of pending IOPs to be serviced by accessing the spare storage device.

19. The program product of claim 16, wherein the program code, when executed by the controller, causes the controller to perform:
based on the monitoring of access frequencies of address ranges mapped to the data storage array, the controller repeatedly updating the identified address ranges and the dataset on the spare storage device.

20. The program product of claim 16, wherein:
wherein the program code, when executed by the controller, causes the controller to perform determining whether to service read IOPs requesting data within the dataset by reference to the spare storage device based on a read IOP policy;
wherein the controller performs the directing for those read IOPs for which the read IOP policy indicates are to be serviced by reference to the spare storage device.

21. The program product of claim 16, wherein the program code, when executed by the controller, causes the controller to perform:
in response to a read IOP targeting a particular data granule within the dataset, the controller initiating concurrent retrieval of the particular data granule from both the data storage array and the spare storage device and cancelling retrieval of the particular data granule from one of the data storage array and the spare storage device based on the read IOP policy.

22. A program product, comprising:
a storage device; and
program code stored in the storage device, wherein the program code, when executed by a controller configured to be coupled to a spare storage device and to a plurality of primary storage devices across which a data storage array is distributed, causes the controller to perform:
the controller monitoring access frequencies of address ranges mapped to the data storage array;
based on the monitoring, the controller identifying frequently accessed address ranges that are read more often than written;
in response to the identifying, the controller initiating copying of a dataset associated with the identified address ranges from the data storage array onto the spare storage device while refraining from copying other data from the data storage array onto the spare storage device;
the controller directing read input/output operations (IOPs) targeting the identified address ranges to be serviced by access to the spare storage device; and
in response to a failure of a failed storage device among the plurality of primary storage devices, rebuilding contents of the failed storage device on the spare storage device in place of the dataset associated with the identified address ranges, wherein the rebuilding includes:
initiating an invalidate and erasure process to invalidate all entries no longer to be used and erase blocks no longer valid from the spare storage device; and
during the erasure process, the controller directing servicing of an IOP targeting data in the dataset by reference to the spare storage device.

* * * * *